April 5, 1960     J. B. BEACH     2,931,519
AIRCRAFT COMPONENT DOLLY
Filed Oct. 28, 1954     8 Sheets-Sheet 6

INVENTOR.
JAMES B. BEACH
BY
George C. Sullivan
Agent

April 5, 1960     J. B. BEACH     2,931,519
AIRCRAFT COMPONENT DOLLY Filed Oct. 28, 1954     8 Sheets-Sheet 8

*INVENTOR.*
JAMES B. BEACH
BY
Agent

United States Patent Office 2,931,519
Patented Apr. 5, 1960

2,931,519

AIRCRAFT COMPONENT DOLLY

James B. Beach, Van Nuys, Calif., assignor to Lockheed Aircraft Corporation, Burbank, Calif.

Application October 28, 1954, Serial No. 465,301

10 Claims. (Cl. 214—1)

This invention relates to mobile trucks or dollies and relates more particularly to dollies useful in installing and removing aircraft jet engines and other heavy and relatively heavy aircraft components.

It is a general object of the invention to provide a truck or dolly of this kind that is practical and dependable and that has such an extensive range of vertical adjustment or operation so as to be substantially universally useful in installing and removing the jet engines of various airplanes and in installing and removing other airplane components.

Another object of the invention is to provide a truck or dolly of this type incorporating a load-supporting upper assembly or frame movable vertically, with substantially no horizontal displacement, between a collapsed or lower position where it is but a few inches from the ground surface to an extended or elevated position several feet above the ground. This feature well adapts the dolly for the ready reception of its load either from different types of ground handling equipment or from airplanes of different models, etc., and to either elevate the load to position for installation in the airplane or to lower the load from an airplane to position for convenient transfer to other trucks or ground-handling equipment. The extremely compact condition of the dolly when the load-supporting frame is in the lowered position also well suits the dolly for stowage and transportation in aircraft and other vehicles with, or without, its load.

Another object of the invention is to provide a truck or dolly of this kind embodying a unique arrangement and combination of hydraulically actuated scissors means for effecting vertical movement of the load-supporting frame, which means permits or provides for the vertical movement of the frame from an extremely low collapsed position to an elevated position. This combination includes an initiating ram or booster ram for starting the upward travel of the frame and stationary primary hydraulic ram means for continuing the upward movement to the full raised position of the frame. The initiating ram means is operable to apply a substantially vertical force to the scissors means when the same is in its lowermost position to move the frame and scissors to a slightly raised position where the main ram means may apply a sufficiently vertical force component to continue the lifting of the frame. The combination of the two ram means makes it possible to transport the dolly in a very compact condition and to load and unload the dolly with the load-carrying frame close to the floor or ground.

Another object of the invention is to provide a dolly of this kind incorporating caster means adapted to be arranged to provide the truck or dolly with exceptional lateral stability.

It is another object of the invention to provide an aircraft component dolly including an adjuster assembly on the vertically movable frame equipped with mounting pads for the reception of the engine or other load and characterized by means for producing independent axial, lateral, vertical and roll movements or adjustments.

A further object of the invention is to provide a truck or dolly of the character described in which the adjuster assembly may be lengthened and shortened as the conditions of use require, that is, the mounting pads may be moved longitudinally one relative to the other and while the lateral, vertical and roll movement producing means are independently operable, their actuation may be concurrent or successive to obtain practically any combination of motions in order to facilitate the installation and removal of engines and other aircraft components.

Other objectives and features will become apparent from the following detailed description of a typical preferred embodiment throughout which reference will be made to the accompanying drawings wherein.

The truck or dolly may be said to include a wheeled bed or lower frame 10, an upper frame 11, a hydraulically actuated scissors mechanism 12 supporting the frame 11 on the frame 10 for vertical adjustment or movement and an adjuster assembly 13 on the upper frame 11 for receiving the load.

The lower frame 10 is a rectangular structure comprising rigidly connected side beams 14 and end beams 15. Appropriate tow-bar means 16 is attached to either end beam 15 by suitable brackets or fittings 17, see Figure 2. Although the lower frame 10 may be equipped with any suitable form of wheels it is preferred to provide caster means at both ends of the frame. Each of the four caster assemblies includes a rubber-tired wheel 18 rotatably mounted in a fork 20 protruding downwardly from a plate 21, see Figure 12. The plate 21 carries the main vertical caster shaft or pin 22 which, in turn, is rotatably mounted in the caster supporting arm 23 by spaced bearings 24 and 25. The supporting arm 23 is removably secured to the upper face or frame 10 at a corner thereof and inclines upwardly therefrom. Bolts or screws 26 attach the caster arms 23 of the several casters to the frame 10 in such a manner that the casters may be installed in fore and aft positions, shown in full lines in the drawings, where they project axially from the elongate bed of frame 10 or in athwart positions shown in broken lines in Fig. 4, where they extend laterally to provide greater lateral stability for the dolly.

Figures 10, 11, 12:
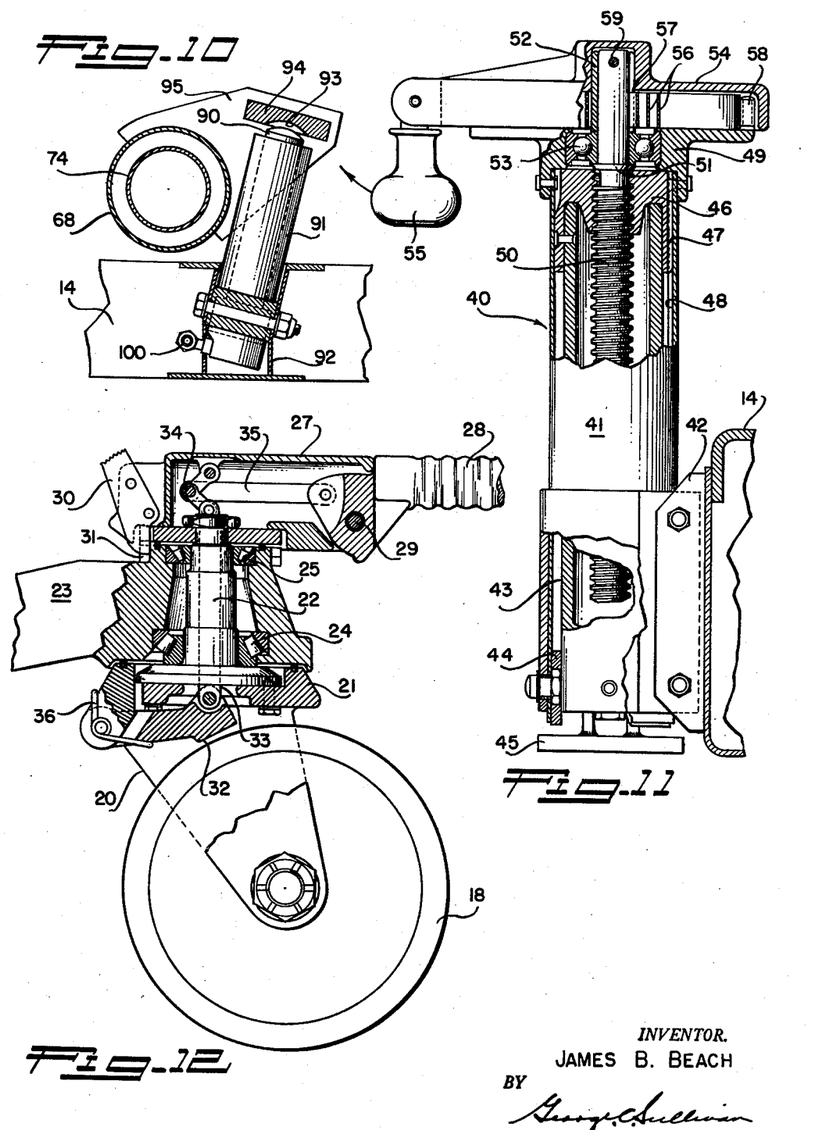
Figure 10 is an enlarged fragmentary vertical sectional view of the initiating or boosting ram means taken substantially as indicated by line 10—10 on Figure 2.
Figure 11 is an enlarged side elevation of one of the ground jacks or ground locks with portions broken away to appear in vertical cross section.
Figure 12 is a side elevation of one of the caster means with the major upper portion thereof appearing in vertical cross section.

The casters are preferably provided with tiller means to facilitate guiding or directing of the dolly and with brake means whereby the dolly may be braked or stopped in desired positions.

A cap or housing 27 is secured to the upper end of each caster spindle or pin 22 and a tiller and brake handle 28 is pivoted to the housing at 29 to extend outwardly therefrom. The handles 28 are such that they may be readily manipulated to turn or steer the related caster wheel 18. A catch or dog 30 is pivoted on each of the housings 27 and is adapted to be engaged in any one of several notches 31 in the adjacent arm 23 to hold the caster against movement about the axis of the pin 22. The dogs 30 are releasable from the notches to permit free castering. The abovementioned brake means for the casters include brake shoes 32 pivoted on the under sides of the plates 21 and actuated by rods 33. The caster spindles 22 are tubular and the brake rods 33 extend upwardly through the spindles to connect with toggle link assemblies 34 in the housings 27. Rods 35 are pivotally connected with the toggle means 34 and with eccentric or off-center regions of the handles 28. Torsion springs 36 are connected with the brake shoes 32 to normally hold them in raised or released positions. When the handles 28 are swung downwardly the toggle means 34 are actuated to move the brake shoes 32 against the respective wheels 18 and the toggles 34 are thrown over center to retain the shoes in their actuated positions and to hold the handles 28 in their down or lowered positions. When the handles 28 are again swung upwardly the shoes 32 are released from the wheels 18 and the springs 36 again retain the handles 28 in the raised or horizontal positions and the brake shoes 32 in the released positions.

The bed or lower frame 10 is also preferably provided with leveling jacks 40 which may be employed to level the dolly or, if desired, to obtain limited overall vertical adjustment of the dolly. The jacks 40 are preferably secured to the side beams 14 adjacent one end of the frame and are characterized by an automatic reaction means for raising them clear of the ground or field upon being freed or partially raised. Each jack 40 includes an upright tubular case 41 secured to a beam 14 by a bracket means 42. A tube 43 slides through a stop and guide 44 in the lower end of the case 41 and carries a ground engaging foot 45 at its lower end. A flanged nut 46 is secured to the upper end of the tube 43 and has a key 47 sliding in a groove 48 in the wall of the case 41 to be held against angular movement. The stop 44 limits the downward travel of the nut 46. The tubular case 41 has a cap or flange 49 secured to its upper end and the upward travel of the nut 46 is limited by this flange. A screw 50 is threaded through the nut 46 and has a flange or shoulder 51 spaced below a collar 52, the collar being fixed on the screw. A suitable anti-friction bearing 53 is secured in the flange 49 of the case 41 and engages between the shoulder 51 and the collar 52 of the screw 50 to support the screw for free rotation while restraining the screw against axial movement. A cover or cap 54 is spaced above the flange 49 and has a pivoted handle 55 to facilitate its manual rotation. The cap 54, collar 52 and screw 50 may be secured together by a pin 59. A torsion spring or "clock spring" 56 is connected between the flange 49 and screw 50 to store energy when the screw is rotated to actuate the foot 45 downwardly against the ground for dolly leveling and stabilizing purposes, which energy is employed to automatically rotate the screw in the opposite direction to raise the foot a considerable distance above the ground after the foot has been initially cleared of the ground by manual rotation of the cover 54 and screw 50. The spring 56 has its inner end anchored to the collar 52 at 57 and a post or pin 58 secures the outer convolution of the spring to the relatively stationary flange 49 of the case 41. This arrangement is such that upon manual turning of the handle cover 54 in one direction the screw 50 is rotated to advance the nut 46 and foot 45 downwardly to push the foot 45 against the ground during which rotation energy is stored in the spring 56. This energy is insufficient to rotate the screw 50 to free the foot 45 from the ground. However, when a workman rotates the handle cover 54 in the other direction a few turns to free the foot 45 from the ground the energy 56 previously stored in the spring continues to rotate the screw 50 in the direction to raise the foot 45 to a position where it will clear inequalities or raised irregularities of the field or ground. This automatic action of the spring 56 thus prevents damage to the lifting jack 40 that might otherwise occur as a result of insufficient upward retraction of the foot 45.

Figure 3:
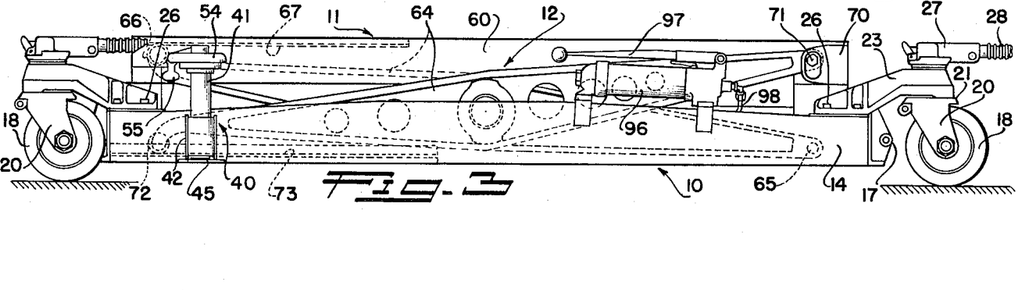
Figure 3 is a side elevation of the dolly in the collapsed or lowered condition.

The upper frame 11 of the dolly is a rectangular structure preferably proportioned to nest upon the lower frame 10 when the dolly is in the fully retracted or collapsed condition illustrated in Figure 3. This upper frame 11 includes two parallel side beams 60 and depressed or underslung end beams 61. When the frame 11 is in its lowermost position, dowels or pins 62 on its end beams 61 engage in openings in the beams 15 of the lower frame 10 to stabilize the assembly and to hold the upper frame against unwanted movement. The beams 61 of the upper frame 11 may also rest on pads 63 of rubber, or the like, provided on the beams 15 of the lower frame. The upper frame 11 serves to carry the adjuster assembly 13, as will be later described.

Figure 1:
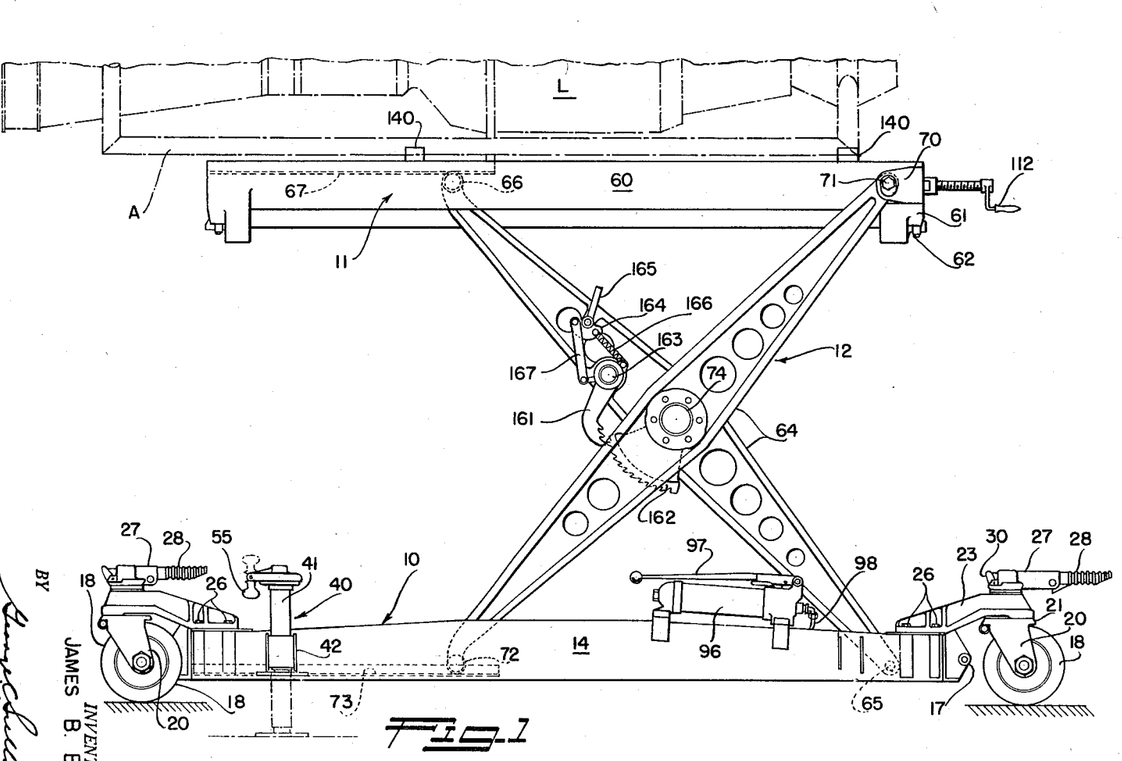
Figure 1 is a side elevation of the truck of the invention showing the load carrying frame in an elevated position, with the load appearing in broken lines.
Figure 4:
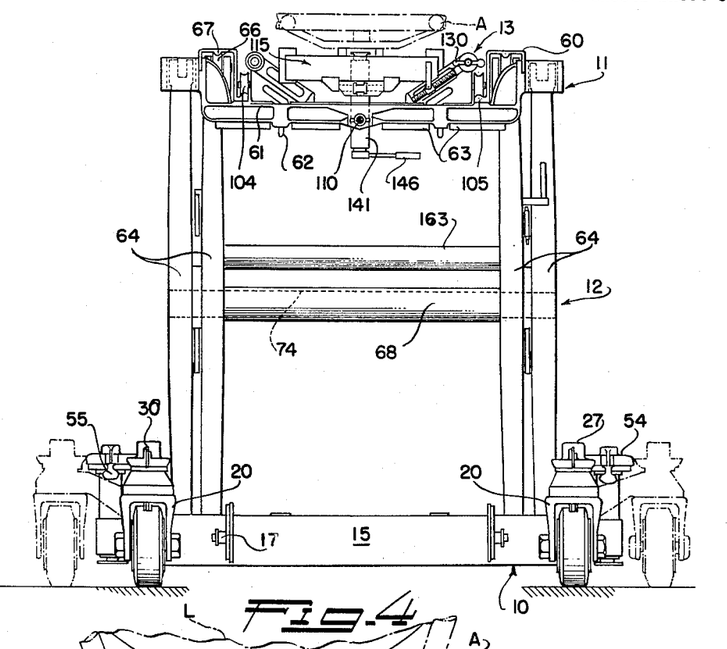
Figure 4 is an end view of the dolly with the scissors means and load carrying frame, etc. in the raised condition, a portion of the load appearing in broken lines, and with broken lines illustrating laterally extended positions of the casters.
Figure 5:
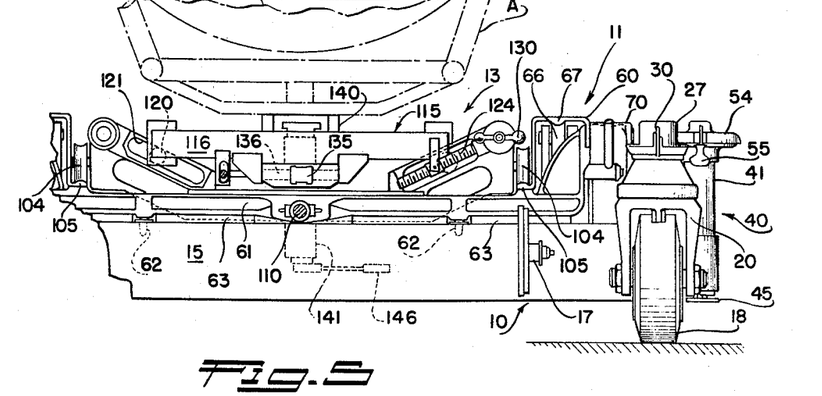
Figure 5 is an enlarged end view of the dolly with the load carrying frame in the lowered position, a portion of the dolly broken away, and with the load or load adapter appearing in broken lines.

The abovementioned scissors means 12 mounts the upper frame 11 on the lower frame 10 for vertical movement between the lowered position of Figure 3 and an elevated or raised position such as shown in Figure 1. The scissors mechanism comprises four like or identical links 64, a pair of links 64 being engaged in side-by-side relation between each side beam 14 of the lower frame 10 and its related side beam 60 of the upper frame 11. Each pair of links 64 has an inner link the lower end of which is pivotally connected with a lower frame beam 14 at a point 65 adjacent one end of the dolly and the upper end of which has a roller 66 riding on a track 67 in a side beam 60 of the upper frame. As shown in Figures 4 and 5, the beams 60 are open-bottomed box type beams and the tracks 67 are on the upper webs of the beams. A tubular horizontal connecting member 68 extends between and connects the two inner links 64 for movement in unison. It should be observed that the pivots 65 of the two inner links 64 are at or adjacent one end of the dolly and that the tracks 67 and rollers 66 are arranged adjacent the opposite end portion of the dolly structure. The outer links 64 of the scissors assembly 12, that is the links 64 which are disposed adjacent and at the outer sides of the above-described inner links 64, each have one end pivotally connected with the upper frame 11. Brackets 70 are secured on the outer sides of the beams 60 of the upper frame 11 adjacent corresponding ends thereof and horizontal bolts or pins 71 hingedly or pivotally secure an end of each outer link 64 in the related bracket. The opposite ends of the outer links 64 have rollers 72 operable along axial tracks 73 in the related lower frame side beams 14, the tracks 73 extending to adjacent the end of the dolly opposite to the end carrying the pivot brackets 70. The two outer links 64 are connected intermediate their ends to operate in unison by a tubular member 74 extending through the above-described connecting member 68 of the inner links 64, this member 74 being secured to the outer sides of the outer links 64. With the dual scissors mechanism or assembly 12 just described, the upper frame 11 is adapted to be moved vertically with respect to the lower frame 10 with no horizontal displacement and while remaining horizontal throughout such movement.

Figure 2:
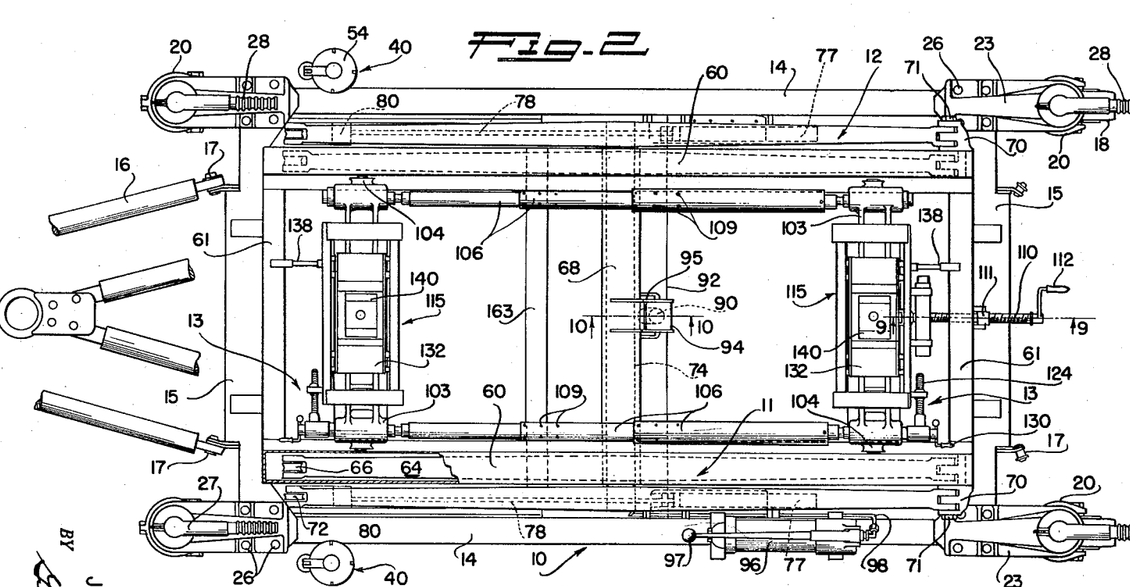
Figure 2 is a top or plan view of the truck or dolly in the collapsed or lowered condition with a portion broken away to appear in horizontal cross section.
Figure 13:
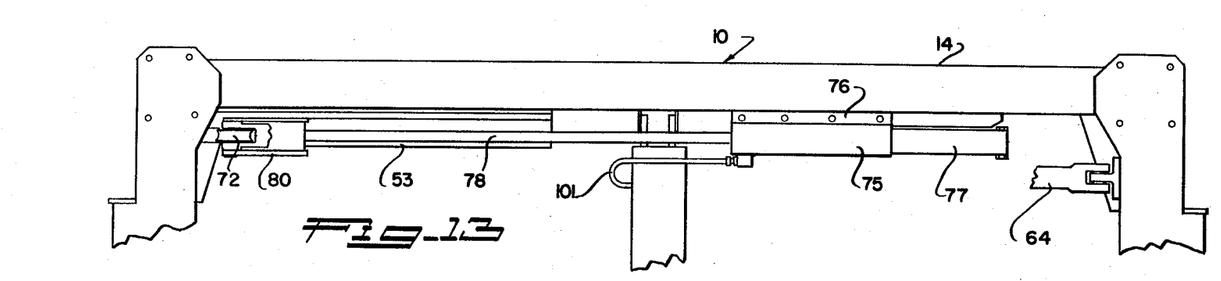
Figure 13 is a fragmentary plan view of one side portion of the lower frame illustrating the main hydraulic ram means and associated parts.
Figure 14:
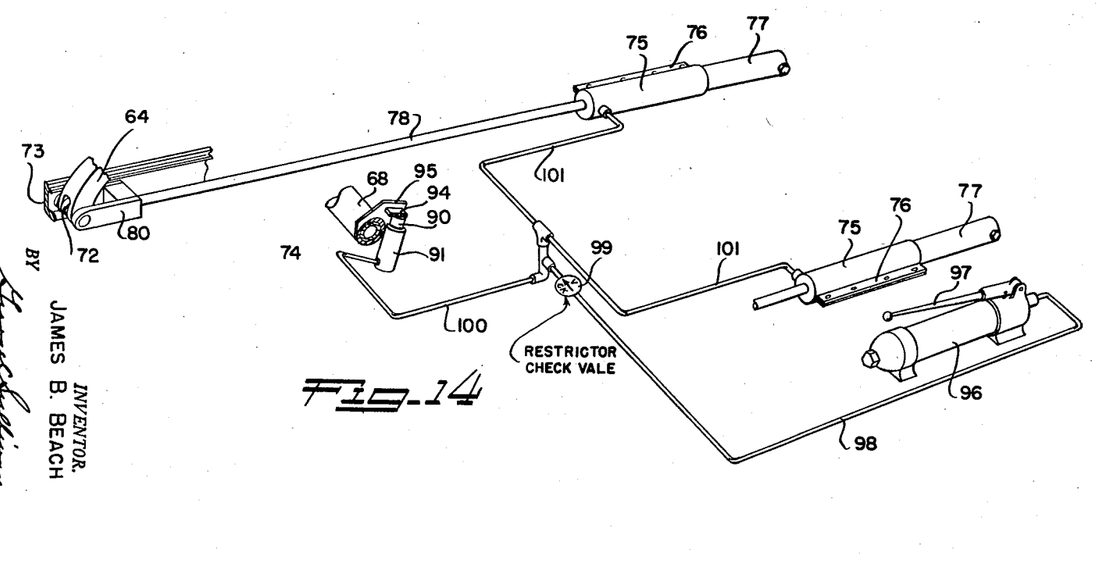
Figure 14 is a diagrammatic perspective view of the hydraulic ram means, hydraulic lines, etc.
Figure 15:
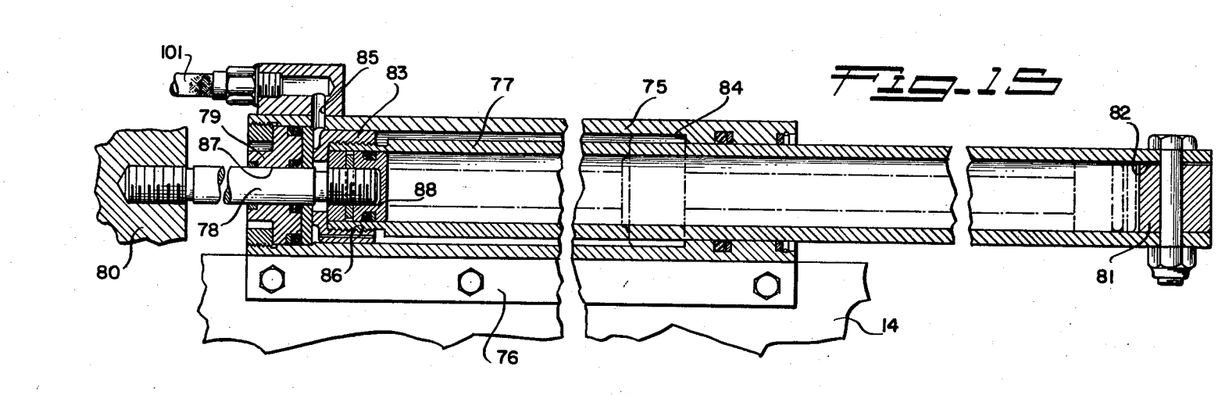
Figure 15 is an enlarged longitudinal detailed sectional view of the main hydraulic ram means.

The fluid pressure or hydraulic system for actuating the scissors assembly 12 to raise and lower the upper frame 11 includes two primary ram units connected between the lower frame 10 and the lower ends or slidable ends of the two outer scissors links 64. Each primary ram unit includes a main cylinder 75 secured to the inner side of a beam 14 of the lower frame 10. It will be seen in Figures 2, 13 and 14 that the main cylinders 75 are horizontal and parallel and are rigidly secured in the frame 10. Flange and bolt connections 76 may serve to attach the cylinders 75 to the beams 14. As shown in Figure 15, each primary ram unit further includes a main or primary tubular ram 77 operable in the cylinder 75 and a second ram 78 operable in the primary ram. The second ram 78 slidably passes through a gland or head 79 in one end of the main cylinder 75 and its outer end is secured to a yoke or block 80 on the lower end or axially movable end of the related outer scissors links 64. As best shown in Figures 2, 3 and 14, the blocks 80 associated with the rams 75 rotatably carry the above-described rollers 72 which ride along the tracks 73 of the lower frame 10. From the foregoing, it may be seen that each primary ram unit has its main cylinder 75 rigidly secured to the lower frame 10 and has its second ram 78 secured to the horizontally movable end of the related scissors link 64.

The main ram 77 of each hydraulic ram unit is of considerable length to extend a substantial distance from the end of the main cylinder 75 opposite the head 79 and its outer end carries a stop block 81. The block 81 is preferably ported at 82 to permit the free movement of atmospheric air into and out of one end of the tubular main ram 77. The opposite, or inner end of the main ram 77 has a piston head 83 slidable in the cylinder 75 between the fully retracted position shown in Figure 15 where it may stop against the head 79 and a fully actuated position where it stops against a shoulder 84 in the cylinder. Actuating hydraulic pressure is admitted to the cylinder 75 by a port 85 adjacent the cylinder head 79 and is operable to displace or force the main ram 77 axially in the cylinder 75. The ram head 83 has one or more axial ports 86 to permit the flow of fluid through the head during ram movement. The secondary ram 78 slidably passes through a central opening 87 in the cylinder head 79 and has a piston head 88 slidably operating in the tubular main ram 77. The outer end of the piston head 88 seats against the inner side of the main ram head 83 prior to actuation. The ram 78 is of considerable length and following actuation of the main ram 77 to the position where its head 83 stops against the shoulder 84 the piston head of the secondary ram 78 is movable through the main ram until its end engages the stop 81 in the remote end of the main ram 77. The full lines of Figure 15 show the parts of the primary ram unit in the retracted or collapsed positions. Upon the introduction of actuating hydraulic pressure through the port 85, the main ram 77 is actuated by this pressure through the cylinder 75 until its head 83 stops against the shoulder 84. During this movement of the main ram 77 the inner side of its head 83 engages with the piston head 88 of the second ram 78 to cause the second ram to move with the main ram 77. When the head 83 of the main ram 77 has stopped against the shoulder 84 the fluid pressure acting on the piston head 88 continues to move the second ram 78 axially through the tubular main ram 77 and this movement may continue until the piston head 88 engages against the stop 81. These two or successive movements of the rams 77 and 78 of the two primary ram units actuate the scissors assembly 12 to elevate the upper frame 11, the primary ram units operating in unison to move the rollers 72 along the tracks 73 toward the center of the dolly.

The hydraulic actuating means for the scissors assembly 12 is characterized by or includes a booster ram or initiating ram 90 operable to move the scissors linkage from its fully collapsed or retracted position to a slightly or partially actuated position where the primary hydraulic ram units may readily actuate the scissors to elevate the upper frame 11. As shown in Figure 3, the links 64 are substantially horizontal when the frame 11 in in its lowermost position so that horizontal forces applied by the primary hydraulic ram units may be insufficient to initiate upward travel of the frame 11. However, the booster or initiating ram 90 applies a vertical force to the scissors assembly 12 to move the links 64 to inclined positions where the primary ram units may readily continue the angular movement of the links to elevate the frame 11. Thus, the initiating ram 90 employed in combination with the primary hydraulic ram units permits the main upper frame 11 to be moved from an extreme depressed position where it is immediately adjacent the ground or field level. The initiating ram 90 is operable in a cylinder 91 stationarily secured to a lower frame member 92 extending between the side beams 14, see Figure 10. The cylinder 91 is adjacent the scissors connecting member 68 and is generally vertical but somewhat inclined. The ram 90 extends from the upper end of the cylinder 91 and is engageable with a socket or depression 93 in a plate 94 carried by a bracket means 95 on the scissors member 68. Upon the introduction of hydraulic pressure to the lower end of the cylinder 91 the ram 90 moves upwardly to press against the plate 94 and raise the member 68. This upward movement of the member 68 initiates angular movement of the scissors links 64 and brings the links to positions where the primary ram units may readily continue the movement to elevate the upper frame 11 to the desired position.

Referring now to Figure 14, which illustrates the fluid pressure system for the ram mechanism, there is a manually operable pump 96 preferably secured to a side beam 14 of the lower frame 10. The pump 96 has an operating lever or handle 97 and is preferably of the type provided with a self-contained hydraulic reservoir and adjustable to three speeds, depending upon the load to be raised, such pumps being well known in the art. For example, a "Blackhawk P–85B" pump may be used. A pressure line 98 leads from the pump 96 to a flow control valve 99 which, in turn, is connected with a pressure line 100 extending to the initiating cylinder 90 and to pressure lines 101 extending to the ports 85 of the primary ram units. The valve 99 is in the nature of a restrictor check valve allowing the free flow of the actuating fluid pressure to the three ram devices but restricting the reverse flow when the pump 96 is conditioned to allow lowering of the frame 11. The restriction of the return flow controls the rate of lowering of the upper frame by gravity.

The invention provides a safety means for preventing unwanted or accidental lowering of the upper frame 11 due to leakage of the hydraulic actuating pressure or from other causes. This means includes a shaft or tube 163 extending through and rotatable in horizontal openings in the upper arms of the inner links 64. The ends of the tube 163 carry toothed pawls or dogs 161 cooperable with toothed segments 162 fixed on the torque tube 68 which rotate as the scissors assembly 12 is actuated. A cam 164 is pivoted on a link 64 and has a conveniently accessible operating lever 165. A spring 166 is connected between the cam 164 and the tube 163 to urge the dogs 161 into cooperation with the tooth segments 162 so as to lock the scissors assembly 12 against operation. A link 167 is pivotally connected between the tube 163, or the adjacent dog 161 fixed thereon, and the cam 164 so that when the lever 165 is manually moved in one direction the two dogs 161 are simultaneously released from the segments 162 to permit free downward actuation of the scissors assembly 12 and upper frame 11.

Figure 9:
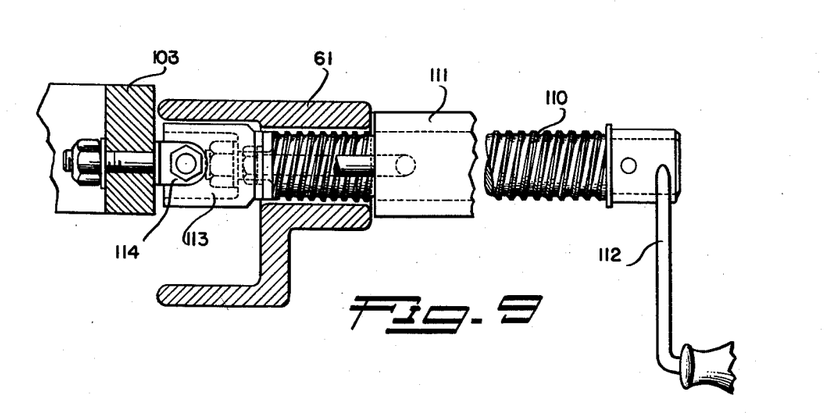
Figure 9 is an enlarged fragmentary vertical sectional view taken as indicated by line 9—9 on Figure 2.

The above-mentioned adjuster assembly 13 is carried by the upper frame 11 and is operable to effect several individual or combined movements or adjustments of the aircraft engine or other load or selected or necessary combinations of such motions. The assembly 13 includes two carriages 103 adapted to be located adjacent the ends of the frame 11 and each extending transversely between the side beams 60 of the frame 11, see Figures 6 and 7. The carriages 103 have rollers 104 on their ends for operating along tracks 105 on the inner sides of the beams 60. The rollers 104 support the carriages 103 for movement along the frame 11 and for movement toward and away from one another. The carriages 103 are connected by two longitudinally extending assemblies of telescoping tubular rods 106. The end rods 106 of each set have collars 107 engaged between spaced bearings 108 on the carriages 103 and the telescoping rods of the assemblies are connected by removable pins 109 engageable in axially spaced openings in the cooperating rods. The rods 106 connect the two carriages 103 for simultaneous axial movement on the dolly and by removing the pins 109 or certain sets of pins the rod assemblies may be lengthened or shortened to permit movement of one carriage 103 relative to the other to alter or change the axial spacing of the carriages. The pins 109 are replaced following such relative adjustment of the carriages to again connect the same for simultaneous movement. The assemblies of the connecting rods 106 are rotatable for the purpose to be later described. The carriages 103, connected one with the other by the rods 106, are simultaneously movable by a screw means including a screw 110 rotatable in a nut 111 anchored to an end beam 61 of the upper dolly frame 11, see Figures 2 and 9. A handle 112 is provided on the outer end of the screw 110 and the inner end of the screw is rotatably anchored in a cup 113 which, in turn, is movably secured to the adjacent carriage 103 by gimbals or bolts 114. It will be seen that by rotating the screw 110 the carriages 103 may be simultaneously moved in either direction axially of the dolly.

The adjuster assembly further includes a second carriage or support 115 on each carriage 103. The supports 115 are rectangular frame-like structures each having two spaced side members 116 above and extending parallel with the adjacent carriage 103 when the supports are in a normal horizontal position. The side members 116 are connected by end members 118. The supports 115 are supported on the carriages 103 for a "rolling" movement, that is for angular movement about a horizontal axis spaced above and parallel with the longitudinal axis of the upper dolly frame 11. The means mounting the supports 115 on their respective carriages 103 for this angular movement include rollers 120 on the end members 118 operating in arcuate slots 121 in the carriages 103. The slots 121 are curved about the above described axis to carry and guide the supports 115 for the angular or rolling movement. Screw thread means is provided to move the supports 115 on the carriages 103 and comprises a nut 122 mounted on a member 116 of each support 115 adjacent and above a slot 121, see Figures 6, 7 and 8. The nuts 122 are pivotally mounted in brackets 123 on the members 116 and screw shafts 124 are threaded through the nuts. Bearing means 125 support the shafts 124 for rotation and a bevel pinion 126 is fixed on each shaft adjacent the bearings. The pinions 126 mesh with gears 127 fixed on axially extending shafts 128. It will be observed in Figure 7 that the screw shafts 124 extend substantially parallel with the slots 121. The pinions 126 mesh with gears 127 fixed on shafts 128. The shafts 128 are coincident with and affixed to adjacent ends of a set of the above described rods 106. An operating handle 130 is secured to the outer end of at least one shaft 128. It will be seen that upon rotation of the handle 130 the two supports 115 are moved or rolled one way or the other about the above-described horizontal axis, the set of telescoping rods 106 forming an operative connection between the gear and screw thread adjusting means of the two supports 115.

Figure 6:
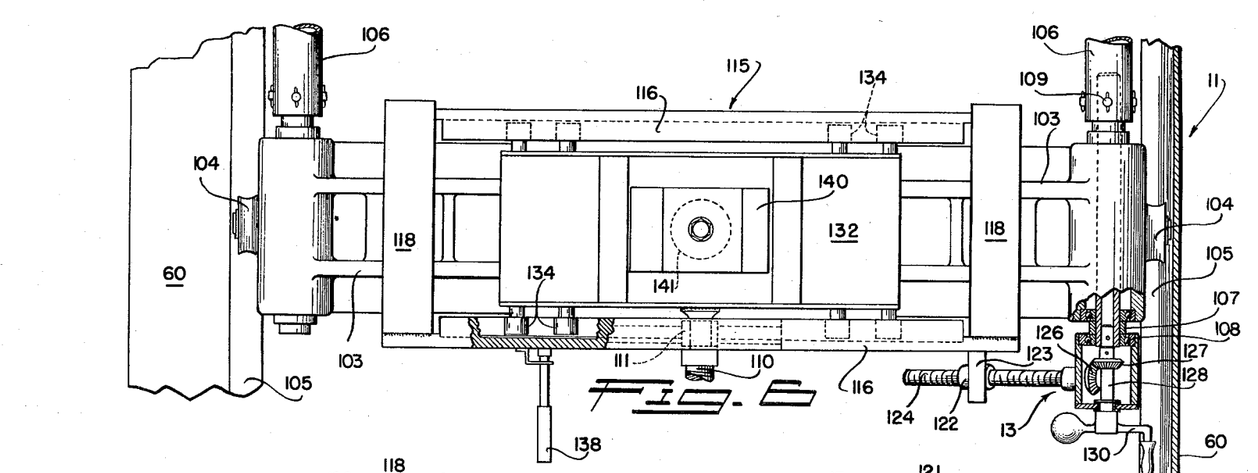
Figure 6 is an enlarged fragmentary plan view of one end portion of the adjuster assembly and adjacent parts of the dolly with certain portions broken away to appear in horizontal cross section.
Figure 7:
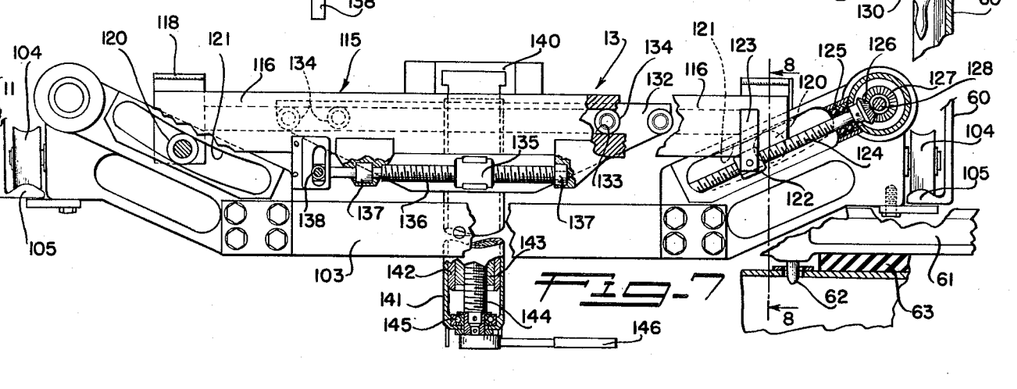
Figure 7 is an end elevation of the equipment illustrated in Figure 6 with portions broken away to appear in vertical cross section.
Figure 8:
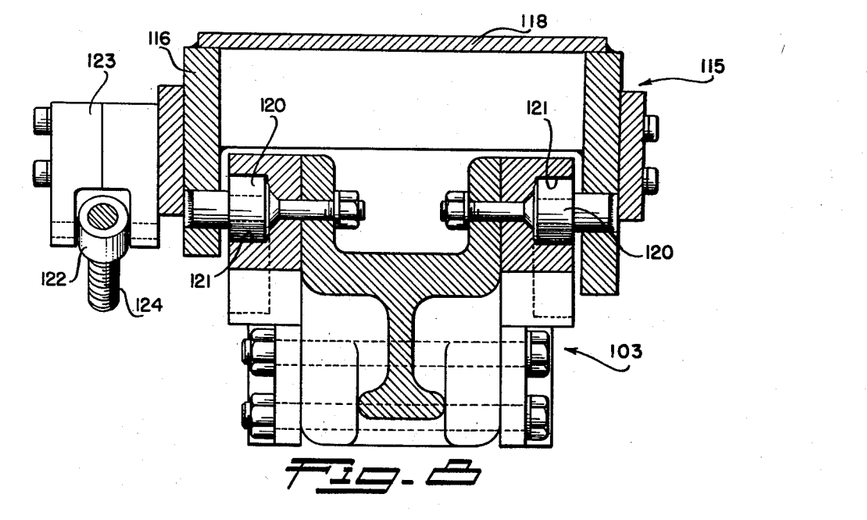
Figure 8 is an enlarged vertical sectional view taken substantially as indicated by line 8—8 on Figure 7.

The load carrying assembly 13 further includes carriages 132 mounted on the supports 115 for adjustment or movement transversely with respect to the longitudinal axis of the dolly. The carriages 132 are rectangular structures and are arranged within the frame-like supports 115. As illustrated in Figures 6 and 7, the side members 116 of the supports 115 have elongate tracks or grooves 133 extending transversely with respect to the side beams 60 of the upper frame 11. The carriages 132 are provided with sets of spaced rollers 134 which operate in the grooves to support the carriages 132 for transverse movement. Means is provided for moving each carriage 132 on its respective support 115. Each of these carriage moving means includes a nut 135 fixed to a side of the carriage 132 and a screw shaft 136 operating through the nut. The shafts 136 are supported for rotation and restrained against axial movement by thrust bearings 137 mounted on the adjacent members 116 of the supports 115. Ratchet handles 138 are provided to rotate the screw shafts 136. It will be observed that the shafts 136 may be individually rotated in either direction to advance or move their respective carriages 132 transversely with respect to the longitudinal axis of the dolly. Such operations may be used to produce yawing movement or adjustment of the load.

The load supporting assembly 13 preferably further includes a pad or block 140 on each transversely adjustable carriage 132. These blocks 140 are adapted to receive the engine, or other load, being in the nature of supports on which the load may be placed. There is a load receiving block 140 mounted on each carriage 132 at or adjacent the central region thereof. It is preferred to mount the blocks 140 for vertical movement with respect to the carriages 132. The means for moving the blocks 140 vertically include tubular cases 141 secured to and projecting downwardly from the carriages 132. A sleeve 142 slides longitudinally in each case 141 and extends upwardly therefrom to carry the respective block 140. Screw means are provided to move the sleeves 142 upwardly and downwardly in the cases 141 to vertically adjust the blocks 140. Nuts 143 are fixed in the lower ends of the sleeves 142 and rotatable screw shafts 144 operate through the nuts. Thrust bearings 145 on the lower ends of the cases 141 support the screw shafts 144 for rotation and hold the same against axial movement. Ratchet handles 146 are provided on the lower ends of the screw shafts 144 to operate the same. It is believed it will be apparent how operation of the handles 146 will move the related load supporting blocks 140 upwardly or downwardly as required.

The operation and utility of the truck or dolly of the invention will be apparent from the foregoing detailed description. A dolly equipped with the casters is readily moved from place to place with or without its load and may be braked and set in the selected position by operation of the caster brakes 32 and the jacks 40, the latter also being operable to level the dolly if required. As above described, the relationship of the nesting or engaging upper and lower dolly frames 10 and 11 and the combination of the initiating lifting ram 90 and primary ram units makes it possible to move and transport the dolly in the condition where it occupies a minimum of vertical space. This feature also facilitates the loading and unloading of the dolly because the upper frame 11 carrying the load receiving adjuster assembly 13 may be easily and conveniently brought to a position adjacent the ground or field level for the reception and removal of the aircraft component or other load. In Figures 1, 4 and 5, I have shown an object or load "L" in the nature of an airplane engine provided with an adapter "A" arranged on the pads or blocks 140 of the adjuster assembly 13. It is to be understood that this is just one class or type of aircraft component or other load or object that may be handled by the dolly. It will be observed in Figure 5 that the engine or load "L" is in a lowered position close to the field or ground level for convenient inspection, servicing, loading or unloading. To move or elevate the load "L" from the position shown in Figure 5 to the position of Figures 1 and 4, the pump 96 is operated by means of the lever 97 to supply hydraulic pressure to the initiating ram 90 which, as above described, starts the angular movement of the scissors links 64 and when the links have attained a position favorable for continued angular movement by the primary ram units which begin their actuation simultaneously with operation of the initiating ram 90. This operation of the primary ram units actuates the scissors assembly 12 to elevate the upper frame 11 while holding the same in a horizontal position, the frame 11 being moved vertically with little or no lateral or horizontal displacement. The ratchet pawls or safety pawls 161 cooperate with the tooth segments 162 during upward movement of the frame 11 and cooperate to prevent unintentional or accidental lowering of frame 11 when the same has been brought to the selected elevated position.

The load supporting adjuster assembly 13 is capable of a complex pattern or combination of movements to accurately position the load for installation in an airplane, or the like, and in other cases to position the assembly 13 for the reception of a component to be detached from an airplane, or the like. As already described, the carriages 103 may be moved longitudinally or horizontally either simultaneously or individually to position the pads or blocks 140 to receive the load or, in other cases, to adjust or move the load itself. The handle 130 may be rotated to "roll" the support 115 and carriages 132 to either assist in locating the blocks 140 for the reception of the load or to impart an angular adjustment to the load. The upper carriages 132 may be individually moved transversely by simply operating the ratchet handles 138 and the pads or blocks 140 are adapted to be moved vertically by the actuation of their screw shafts 144. The plurality of individual and concerted motions that may be effected with the mechanism of the invention makes it possible to very accurately position an object or load during its installation in an airplane, or the like, and in other instances makes it possible to bring the pads or blocks 140 into proper supporting engagement with a component that is to be removed from the airplane.

Having described only typical forms of the invention I do not wish to be limited to the specific details herein set forth, but wish to reserve to myself any variations or modifications that may appear to those skilled in the art and fall within the scope of the following claims.

I claim:

1. A dolly comprising a wheeled bed, a frame, link means, means connecting the link means with the bed and frame in such a manner that the link means supports the frame on the bed for vertical movement thereon without horizontal displacement, means on the bed for moving the frame vertically, and load supporting means on the frame comprising two assemblies spaced on the frame, each assembly comprising three superimposed carriages, one movable longitudinally of the frame, one movable transversely of the frame, and one movable about a horizontal axis spaced above the frame, and a load receiving part on the upper side of each assembly.

2. A dolly comprising a wheeled bed, a frame, link means, means connecting the link means with the bed and frame so as to support the frame on the bed for vertical movement thereon without horizontal displacement during such movement, means on the bed for moving the frame vertically, and load supporting means on the frame comprising two assemblies spaced on the frame, each assembly comprising three superimposed carriages, one movable longitudinally of the frame, one movable transversely of the frame, and one movable about a horizontal axis spaced above the frame, screw thread means for moving each respective carriage, and a load receiving part on the upper side of each assembly.

3. A dolly comprising a wheeled bed, a frame, scissor link means, means connecting the link means with the bed and frame so as to support the frame on the bed for vertical movement thereon without horizontal displacement, means on the bed for moving the frame vertically, and load supporting means on the frame comprising two assemblies spaced on the frame, each assembly comprising three superimposed carriages, one movable longitudinally of the frame, one movable transversely of the frame, and one movable about a horizontal axis spaced above the frame, a load receiving part on the upper side of each assembly, and means for moving the assemblies longitudinally of the frame.

4. A dolly comprising a wheeled bed, a frame, a pair of pivoted-together scissor links supporting the frame on the bed for vertical movement thereon, one link having an end pivoted to the bed and an end connected with the frame for horizontal movement, the other link having an end pivoted to the frame and an end connected with the bed for horizontal movement, means on the bed for moving the frame vertically, and load supporting means on the frame comprising two assemblies spaced on the frame, each assembly comprising three superimposed carriages, one movable longitudinally of the frame, one movable transversely of the frame, and one movable about a horizontal axis spaced above the frame, a load receiving part on the upper side of each assembly, screw means for moving each respective carriage, and means connecting the longitudinally movable carriages of the two assemblies for movement in unison.

5. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage in a direction transverse of said first-named axis, and a load receiving part carried by the upper carriage.

6. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage in a direction transverse of said first-named axis, means associated with each carriage for individually moving the same, and a load receiving part carried by the upper carriage.

7. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage transversely of said first-named axis, and a vertically movable load receiving pad on the upper carriage.

8. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage transversely of said first-named axis, a load receiving pad on the upper carriage, and means associated with each carriage for moving the same, and means connecting the lower carriages of the two assemblies for movement in unison.

9. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage transversely of said first-named axis, a load receiving pad on the upper carriage, and means associated with each carriage for moving the same, and means connecting the lower carriages of the two assemblies for movement in unison including a variable length assembly of telescopically connected tubes.

10. In a dolly of the character described the combination of; a wheeled mobile bed, a frame having a longitudinal axis, means supporting the frame on the bed for vertical movement thereon, two load carrying assemblies spaced longitudinally on the frame, each assembly including a lower carriage movable longitudinally on the frame, an intermediate carriage supported on the lower carriage for movement about an axis substantially parallel with and spaced above the first-named axis, an upper carriage movable on the intermediate carriage transversely of said first-named axis, a load receiving block at the upper side of the upper carriage, and screw means for moving the block vertically.

References Cited in the file of this patent

UNITED STATES PATENTS

| | | |
|---|---|---|
| 956,189 | Schwarz | Apr. 26, 1910 |
| 2,001,744 | Patterson | May 21, 1935 |
| 2,043,887 | Dement | June 9, 1936 |
| 2,132,343 | Jarrett | Oct. 4, 1938 |
| 2,471,901 | Ross | May 31, 1949 |
| 2,479,623 | Johnson | Aug. 23, 1949 |
| 2,523,734 | Stephenson et al. | Sept. 26, 1950 |
| 2,546,361 | Floyd | Mar. 27, 1951 |
| 2,613,822 | Stanley | Oct. 14, 1952 |
| 2,617,547 | Pridy | Nov. 11, 1952 |
| 2,672,242 | Marsh | Mar. 16, 1954 |

FOREIGN PATENTS

| | | |
|---|---|---|
| 1,076,006 | France | Oct. 21, 1954 |